United States Patent [19]

Ferrar

[11] Patent Number: 5,381,257
[45] Date of Patent: Jan. 10, 1995

[54] SIMULTANEOUS DATA COMMUNICATION AND FIBER PERTURBATION DETECTION SYSTEM

[75] Inventor: Carl M. Ferrar, East Hartford, Conn.

[73] Assignee: United Technologies Corporation, Hartford, Conn.

[21] Appl. No.: 12,114

[22] Filed: Feb. 1, 1993

[51] Int. Cl.$^6$ ............................................. G01B 9/02
[52] U.S. Cl. ............................. 359/156; 250/227.17; 250/227.19
[58] Field of Search ............... 359/110, 111, 112, 137, 359/122, 156, 157, 192; 379/35; 356/73.1; 250/227.16, 227.17, 227.19

[56] References Cited

U.S. PATENT DOCUMENTS

| | | | |
|---|---|---|---|
| 4,567,586 | 1/1986 | Koeck | 359/137 |
| 4,863,270 | 9/1989 | Spillman, Jr. | 250/227.19 |
| 5,094,534 | 3/1992 | Cole et al. | 250/227.19 |
| 5,136,666 | 8/1992 | Anderson et al. | 359/156 |
| 5,258,615 | 11/1993 | Thorley | 250/227.17 |

OTHER PUBLICATIONS

Lloyd C. Bobb, United States Statutory Invention Registration, Reg. No. H371, Optical Fiber Interferometer, Nov. 3, 1987.
Mode Couplings Due To External Forces Distributed Along A Polarization-Maintaining Fiber: An Evaluation (Makoto Tsubokawa, Tsunehito Higashi, and Yukiyasu Negishi; Applied Optics/vol. 27, No. 1/1 Jan. 1988).
Measurement Of Spatial Distributions Of Mode Coupling In Polarization-Maintaining Fibers (Takada; Noda; Sasaki; Electronics Letters/vol. 20, No. 3, 2 Feb. 1984, pp. 119-121).
Measurement Of Spatial Distribution Of Mode Coupling In Birefringent Polarization-Maintaining Fiber With New Detection Scheme (K. Takada; J. Noda; K. Okamoto; Optics Letters/vol. 11, No. 10/Oct. 1986.

Primary Examiner—Richard E. Chilcot, Jr.
Assistant Examiner—Bhavesh Mehta
Attorney, Agent, or Firm—Gerald L. DePardo

[57] ABSTRACT

A simultaneous data communication and fiber perturbation detection system includes a narrow band optical data signal from a source 10 which is polarized by a polarizer 14 along a slow polarization axis of a polarization preserving birefringent optical fiber 28, and a broadband probe optical signal from a source 20 which is polarized along a fast polarization axis of the fiber 28. A perturbation 32 in the fiber 28 causes a portion of the probe signal to be coupled onto the orthogonal slow polarization. At the receiving end of the fiber 28, a beamsplitter 34 splits the signal along a path 36 which extracts the data signal to be received by a data receiver 44, and a path 38 which extracts the probe signal and employs an adjustable interferometer 58 to determine the location along the fiber 28 where the perturbation 32 exists. The central wavelengths $\lambda 1, \lambda 2$ of the data and probe optical signals may be the same or different.

11 Claims, 1 Drawing Sheet

SIMULTANEOUS DATA COMMUNICATION AND FIBER PERTURBATION DETECTION SYSTEM

This invention was made under a Government Contract and the Government has rights therein.

TECHNICAL FIELD

This invention relates to fiber optic communication links, and more particularly to perturbation detection along a communication link while simultaneously transmitting high frequency, narrow wavelength-spread data.

BACKGROUND ART

It is known in the art of long distance (i.e., greater than one mile) high data rate (i.e., greater than one GHz) optical communication systems that to preserve data transmission integrity, a narrow bandwidth (or narrow wavelength-spread) optical source should be used. More specifically, if an optical signal is digitally transmitted, i.e., coded as ones and zeros, along a optical fiber, where a zero corresponds to a low intensity beam and a one corresponds to a high intensity beam, if the wavelength-spread is too wide, ones and zeros associated with one wavelength light may get blended with ones and zeros from another wavelength. This occurs because the fiber exhibits a different refractive index (n), and consequently a different optical path length, for each wavelength. Thus, the propagation time for one wavelength will be different from that for another wavelength in the same fiber. If the data transmission rate is high, only a small amount of phase shift (or time delay) is needed to corrupt the data.

Also, it is known in the art to detect perturbations in a polarization preserving optical fiber using a broadband (or low coherence; or broad wavelength-spread) light source, a variable Michelson Interferometer, and an optical detector, as described in the articles: K. Takada et al, "Measurement Of Spatial Distribution Of Mode Coupling In Birefringent Polarization-Maintaining Fiber With New Detection Scheme", Optics Letters, Volume 11, No. 10 (October 1986) pages 680–682; M. Tsubokawa et al, "Mode Couplings Due To External Forces Distributed Along A Polarization-Maintaining Fiber: An Evaluation", Applied Optics, Volume 7, No. 1 (January 1988), pages 166–173; and K. Takada et al, "Measurement Of Spatial Distributions Of Mode Coupling In Polarization-Maintaining Fibres", Electronics Letters, Volume 20, No. 3 (February 1984), pages 119–121.

This technique provides a broadband light source which injects light into one end of a polarization preserving birefringent optical fiber transmission line. The injected light is confined to a single polarization mode, e.g., by polarizing the light along a first optical axis of the fiber. At a remote (or receiving) end the light is monitored by an optical detector after passing through an adjustable analyzing interferometer (e.g., a Michelson Interferometer having one variable-length leg). If the fiber is perturbed at some point, e.g., by a kink or a twist, the polarization of the propagating light is altered such that a small fraction of the input light in one polarization mode of the fiber is converted (or coupled) to a second polarization mode which is orthogonal to the original polarization mode. Due to the fiber birefringence, the index of refraction for each mode is different; thus, the original and orthogonal polarizations travel different effective optical distances from the perturbation to reach the remote location.

It is known that if light having a wide wavelength spread (i.e., light having many different frequencies), is split into two paths and interfered with itself, the only time the light will add coherently (i.e., all the frequencies add in-phase), is when both optical path lengths are identical. It is also known that the coherence length is an indication of how much the path lengths can differ and still have the interference be considered a coherent sum. Also, the coherence length is inversely related to the wavelength spread. For example, the wider the wavelength spread, the more frequencies that exist in the light and, thus, the smaller the path difference must be to achieve a coherent sum. For example, a one nanometer bandwidth yields a coherence length of about 2 millimeters.

If the wavelength spread of the light source is broad enough such that the coherence length is much shorter than the effective path difference caused by fiber birefringence, the two polarization components do not interfere coherently at the remote location. However, if these components travel unequal arm lengths of the interferometer at the remote location, they will interfere coherently when the arm length inequality equals and compensates for the path difference in the fiber (within the coherence length).

If the arm inequality is variable, and the fiber birefringent characteristics are known, the location of the fiber perturbation can be deduced from the arm inequality at which coherent interference is observed. The resolution achievable in locating the perturbation is inversely related to the probe coherence length; thus, the smaller the coherence length, the better the resolution.

It is desirable to have a high speed optical fiber data transmission system that also has the capability of detecting and accurately locating perturbations along the optical fiber simultaneously with the data transmisson. However, accurately determining the location of the perturbation, as described above, requires light with a broad wavelength spread, rather than a narrow wavelength spread needed for high speed data transmission.

DISCLOSURE OF INVENTION

Objects of the invention include provision of narrow wavelength spread data transmission along an optical fiber with simultaneous perturbation detection.

According to the present invention, a narrow band optical data transmission signal is launched into one end of a polarization preserving birefringent optical fiber and polarized along a first polarization axis of the fiber; a broadband optical probe signal is polarized along a second polarization axis of the fiber and combined with the narrow band data signal in the fiber; the combined probe and data signals pass through a perturbation which causes a portion of the broadband probe signal to be coupled to the first polarization axis; at a receiving end of the fiber, the combined signal is split into a first and second path; the data signal is substantially extracted from the signal along the first path and is detected by a data receiver, and the probe signal is substantially extracted from the signal along the second path and is analyzed to determine where the perturbation in the fiber is located; thereby providing simultaneous data transmission and perturbation detection.

According further to the present invention, the probe signal is extracted by an optical filter and analyzed by a polarization analyzer and an adjusting interferometer.

In further accord to the invention, the data signal is extracted by an optical filter and received by a data receiver.

According still further to the present invention, central wavelengths of the data signal and probe signal are different.

The invention represents significant improvements over prior art narrow-band (high coherence) optical data transmission by providing simultaneous fiber perturbation detection. Such a device can be used to provide a tap-resistant communication link, or to detect any perturbation in the system that generates a polarization change, i.e., coupling from one polarization mode to the other (orthogonal) polarization mode of a polarization preserving birefringent optical fiber transmission line.

The foregoing and other objects, features and advantages of the present invention will become more apparent in light of the following detailed description of exemplary embodiments thereof as illustrated in the accompanying drawings.

Figure 1:
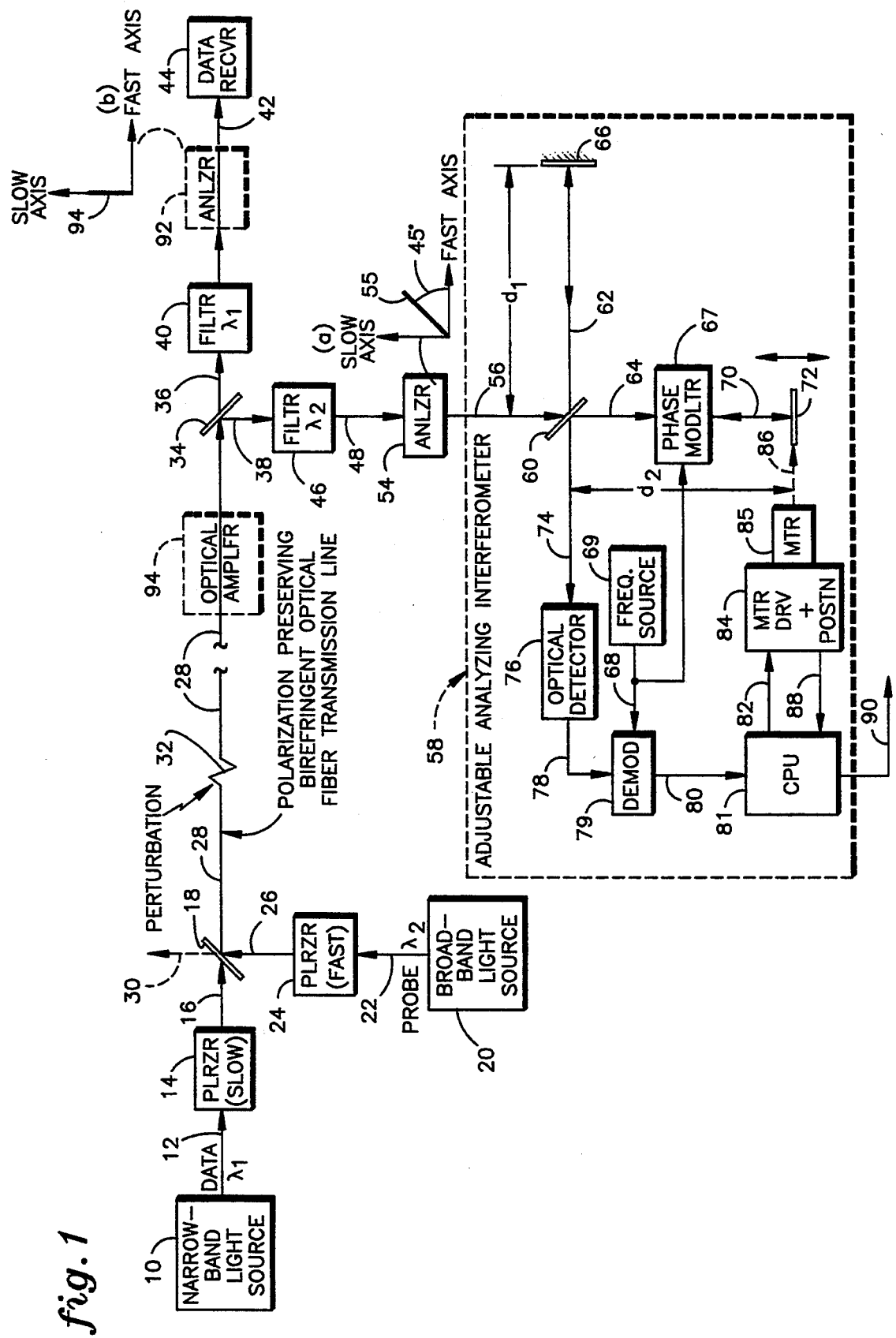
FIG. 1 is a schematic block diagram showing a simultaneous data communication and fiber perturbation detection system having a data signal and a probe signal in accordance with the present invention, and also comprising illustrations.

(a) showing fast, slow, and output axes of an optical analyzer in a probe signal receiving path; and (b) showing the fast, slow, and output axes of an optical analyzer in a data signal receiving path.

BEST MODE FOR CARRYING OUT THE INVENTION

Referring to FIG. 1, a data source or transmitter 10, e.g., a modulated semiconductor light source such as a distributed feedback semiconductor diode laser, having a narrow bandwidth (narrow wavelength spread), e.g., 0.1 nanometers, and having a central wavelength $\lambda 1$ of 1300–1600 nanometers, transmits optical data at a given data rate (e.g., 10 GHz) in an optical fiber 12, to a polarizer 14. Other wavelengths, wavelength-spreads, and data rates may be used if desired. The polarizer 14 linearly polarizes the light from the data source 10 to be along a first (or slow) axis of a polarization preserving birefringent optical fiber 16, e.g., a PANDA fiber. The slow-axis polarized narrow-band light from the polarizer 14 is passed along the fiber 16 to a polarization preserving beamsplitter/combiner 18 (discussed hereinafter).

A continuous wave (cw) k, broadband "probe" light source 20, e.g., a light-emitting diode (LED) or a superluminescent diode (SLD), provides cw light having a broad wavelength spread, e.g., 20 nanometers, centered at a wavelength $\lambda 2$, e.g., 800–1600 nanometers (nm), which travels along an optical fiber 22 to a polarizer 24. The polarizer 24 linearly polarizes the broadband light along a second (or fast) axis of a polarization preserving optical birefringent fiber 26 (similar to the fiber 16), orthogonal to the polarization of the light exiting polarizer 14. The fast-axis polarized probe light is transmitted on the fiber 26 to the beamsplitter/combiner 18 where the data light and probe light on the fibers 16,26, respectively, are combined onto a polarization preserving birefringent optical fiber transmission line 28, e.g., a PANDA fiber (similar to the fiber 16).

The polarization preserving beamsplitter/combiner 18 is designed to pass light polarized along the slow axis, and reflect light polarized along the fast axis. Thus, the slow-axis polarized light on the fiber 16 will be passed straight through the beamsplitter 18 and onto the fiber 28 and any energy along the slow axis will be reflected upwardly in the direction of the line 30. Similarly, the fast-axis polarized light on the fiber 26 will be reflected by the beamsplitter 18 to propagate along the fiber 28, and any energy on the slow axis will be passed straight through the beamsplitter 18 in the direction of the line 30. Because the light on the fiber 16 is polarized solely on the slow axis, all the energy will pass on to the fiber 28. Similarly, because the light on the fiber 26 is polarized solely along the fast axis, the beamsplitter 18 will reflect all of the energy of the light on the fiber 26 onto the fiber 28.

Alternatively, a conventional beamsplitter may be used, if desired. A conventional fifty percent beamsplitter passes half of the energy along the slow axis and half of the energy along the fast axis. Consequently, half of the energy from each polarization would be lost in such a configuration.

The narrow-band (slow-axis) data light and broadband (fast-axis) probe light both propagate along the birefringent optical fiber 28 to a perturbation 32 which causes a portion of the optical probe signal polarized along the fast axis to be coupled to the orthogonal (slow axis) polarization mode. Similarly, a portion of the optical data signal is coupled to the fast axis polarization mode. This mode coupling occurs, as is known, due to twisting or bending of the fiber or due to a communications (or wire) tap device which has been placed in the line 28 to intercept data transmission.

It should be understood that the fiber transmission line 28 is a linearly birefringent fiber having two orthogonal polarization modes and having a different refractive index (n) for each mode. Thus, in a birefringent fiber, light propagates along the same physical path in the fiber but the way the light is polarized determines the index of refraction (n) seen by the light, thereby affecting the speed of the light for a given polarization, as is known.

Although the fiber is bimodal with respect to the polarization modes, it may be single or multi-mode with respect to spatial distribution. For data transmission, single mode spatial distribution is desired because if more than one spatial mode exists, and the propagating velocity is sufficiently different for each of the modes, the data may be corrupted as discussed hereinbefore. As $\lambda$ gets shorter, more spatial modes exist, i.e., the fiber becomes multi-mode. Furthermore, the polarization coupling effect discussed hereinbefore may alter both the polarization mode coupling and spatial mode coupling. Thus, it is desirable to use a long data wavelength that provides a single spatial distribution mode to avoid exacerbating the spatial mode changes caused by the fiber perturbation.

The data and probe light signals in the fiber 28 propagate to a beamsplitter 34, e.g., a fifty percent beamsplitter, which splits the beam onto two polarization preserving optical fibers 36,38. Light travelling along the fiber 36 is passed to an optical filter 40 which passes only light having a wavelength of $\lambda 1$, i.e., the wavelength of the narrow band data signal. The output of the filter is passed along an optical fiber 42 to a data receiver 44, e.g., an optical detector, capable of receiving high data rate communications.

The light along the fiber 38 is passed to a filter 46 which passes Light only of the wavelength $\lambda 2$ (i.e., the wavelength of the broadband probe signal). The output signal from the filter 46 is passed along a polarization preserving optical path 48, e.g., a polarization preserving fiber, to an analyzer 54 having an output axis 55 set at 45° from the fast axis.

The analyzer 54 provides an output light signal that is polarized along the analyzer output axis 55 and that is indicative of that portion of the signals along the fast axis and the slow axis that lies along the analyzer output axis 55. The analyzer 54 is needed because the signals on the fast and slow axes cannot coherently interfere (or mix; or beat) with each other because they are orthogonally polarized. An output light beam 56 from the analyzer 54 is passed along a path to an adjustable analyzing interferometer 58.

The light 56 within the analyzing interferometer 58 is passed to a beamsplitter/combiner 60 (beamsplitter) which splits the beam 56 into two beams 62,64. The beam 62 reflects off a mirror 66 located a fixed distance $d_1$ from the beamsplitter 60, and travels back to the beamsplitter 60 along the same path. Similarly, the beam 64 is passed to a phase-modulator 67 (discussed hereinafter) which is driven by a frequency signal on a line 68 from a frequency source 69. The phase modulator 67 provides a modulated beam 70 to a mirror 72, located a variable distance $d_2$ from the beamsplitter 60, which reflects the modulated beam 70 back to the beamsplitter 60 along the same path as the incident beam, thereby doubling the magnitude of the phase modulation due to a second pass through the modulator 67.

The light from the mirrors 66,72 is recombined at the beamsplitter 60 and provides combined beam 74 to an optical detector 76 comprising, e.g., a photo diode and an amplifier, as is known. The optical detector 76 provides an electrical signal on a line 78 indicative of the intensity of the light incident thereon (which is propositional to the square of the optical electric field). The signal on the line 78 is fed to a synchronous demodulator 79 (discussed hereinafter), driven by the frequency signal on the line 68 from the frequency source 69. The demodulator 79 which provides a demodulated electronic signal on a line 80 to a central processing unit 81 (CPU) which records the optical intensity. The CPU 81 sends a signal on a line 82 to a known motor drive/position circuit 84 to drive a motor 85. The motor 85 positions the adjustable mirror 72 through a mechanical link 86. Also, the circuit 84 provides a position signal on a line 88 indicative of the position of the mirror 72. The CPU 81 records the position of the mirror 72 along with the intensity seen from the optical detector 76 (and demodulated by the synchronous demodulator 79), thereby providing an intensity/position profile over the scanned range of the mirror 72.

The distance required for the scanning mirror 72 to be scanned is determined by the difference between the two effective optical path lengths for the light travelling in the fast and slow axes over the length of the transmission line 28. Thus, the scanning distance depends on how much birefringence exists in the transmission line 28, i.e., the difference between $n_1$ and $n_2$. Also, the amount of birefringence is inversely proportional to the amount of coupling that occurs for a given perturbation, i.e., the higher the birefringence the less light will be coupled to the orthogonal polarization for a given perturbation. Alternatively stated, the less fiber birefringence, the more sensitive the system is to perturbations.

Thus, the transmission line should be chosen to have a low birefringence, i.e., a small difference between $n_1$ and $n_2$, such that the scanning distance is minimized, but not so low as to make the system too sensitive to environmental perturbations, thereby causing small perturbations to produce large signal degradation. For example, the shifting of a fiber in the sheath should not cause significant mode coupling.

A relatively small birefringence of ten parts per million, i.e., $n_1 - n_2 /((n_1 + n_2)/2) = \Delta n/n_{avg} = 1/100,000$, is acceptable provided the fiber is not subjected to significant perturbations in its baseline (installation) state. For this amount of birefringence, and for a transmission line 28 length of 10,000 meters, the mirror 72 must scan 0.1 meters (10 cm). Other mirror scan distances may be used if desired. For example, to reduce the mirror scan distance, a lower birefringence ratio may be used or the mirror 72 may be immersed in a fluid having a large refractive index.

The adjustable mirror 72 adjusts for the difference in optical path lengths of the two orthogonal polarizations of the perturbed probe signal, as is known. When the difference between the distances $d_2$ and $d_1$ is the same as the difference in the optical path length between the two orthogonal polarizations, the fields add coherently, thereby providing maximum output intensity. This difference also indicates where along the fiber the perturbation is located.

More specifically, each of the beams 62,64 contains a large component of the probe light, which has traversed the entire transmission line in its original (fast) polarization mode, and a small component, which has been converted to the orthogonal (slow) mode at the perturbation 32 in the line 28. Thus, when the beams recombine at beamsplitter 60 after reflecting from mirrors 66,72, the resultant combined beam contains two large components and two small components.

If the distances $d_1,d_2$ from the mirrors 66,72 to beamsplitter 60 are equal (i.e., $d_1 = d_2$), the large components interfere coherently with each other and the small components interfere with each other because they have travelled equal total path lengths. The interference results in observable intensity variations of the combined beam 74 as a function of the difference $D = d_1 - d_2$ when D is within a probe coherence length of zero. The magnitude of the variations increases as D decreases, leading finally to an intensity maximum when $D = 0$. Thus, adjustment of the mirror 72 to achieve this maximum intensity can be useful in accurately identifying the $D = 0$ (equal interferometer arms) condition.

When $D = 0$ ($d_1 = d_2$) and no perturbation exists near the receiving end of the fiber 28, the large components do not interfere coherently with the small components. This occurs because the small components travel more slowly than the large components after leaving the perturbation; thus, they lag the large components by an amount proportional to the distance from the perturbation to the interferometer 58, i.e., to the receiving end of the line.

However, when $D = 0$ and a perturbation exists within a probe coherence length of the receiving end of the fiber 28, the large components do interfere coherently with the small components. Thus, in that case the interference represents the coherent sum of the 4 beam components.

If the mirror 72 is moved away from the $D = 0$ point, the interferometer arm lengths begin to differ. If no perturbation exists near the end of the fiber, the coherence between the large components and between the small components diminishes rapidly as D exceeds the probe coherence length, and the intensity of the combined beam will approach a constant level which is lower than the intensity maximum described above, and which represents the incoherent sum of the four beam components.

However, if a perturbation exists prior to the receiving end of the line 28, the large component of one beam will interfere coherently with the small component of the other beam when D is such that the path difference within the interferometer is equal to and compensates for the birefringence path difference (BPD) of the transmission line 28 between the perturbation 32 and the interferometer 58, i.e., when the total path length of the large component equals that of the small component. The interference causes intensity ripples in the intensity/position profile as the total path difference approaches the probe coherence length, and the magnitude of these ripples (each ripple corresponding to changing D by one-half probe wavelength) grows to an interference maximum as the path difference approaches zero.

Thus, to scan the entire transmission line 28 for perturbations, the mirror 72 may be scanned such that D varies from zero to the full birefringence path difference of the line 28. The CPU 81 reads the resulting intensity/position profile, compares it with pre-stored baseline data for the unperturbed transmission line, and provides an output signal on a line 90 indicative of the transmission line 28 location associated with each interference maximum caused by each perturbation 32 in the fiber 28.

The optical phase modulator 67, e.g., an electro-optic modulator such as a crystal that changes its index of refraction based on a voltage applied thereto, is located in one leg of the interferometer 58. Other optical phase modulators may be used if desired. The modulator 67 modulates the optical phase of the optical signal 64 in response to the frequency signal on the line 68 from the frequency source 69 and causes the intensity to vary at a modulation frequency, thereby permitting the use of synchronous demodulation to improve sensitivity of the peak detection. Also, the modulation amplitude should be small (1/10 to 1/100) compared to the probe light wavelength, to avoid washing-out the signal.

Instead of an optical phase modulator 67, equivalent phase modulation may be achieved by dithering the mirror 72 a small amount at a high frequency about each position of the mirror 72, e.g., by a known piezoelectric device attached to the mirror 72.

The electrical synchronous demodulator 79 (or lock-in-amplifier) connected at the output of the optical detector 76, removes all the frequencies except for the phase modulation frequency; thereby acting effectively as a narrow-band filter to improve the signal-to-noise ratio. Also, the synchronous demodulator 79 is driven by the same frequency source 69 as the phase modulator 67. Instead of a synchronous demodulator, an electronic narrow-band filter may be placed at the output of the detector 76 and tuned to the phase modulation frequency. It should be understood that if the signal strength of the interfered signal is strong enough, phase modulation and demodulation is not required.

In addition to or instead of the filter 40, an analyzer 92 may be placed before the data receiver 44 to help isolate the data signal from the probe signal. In that case, the analyzer 92 output axis 94 would be aligned with the polarization of the unperturbed data signal (i.e., the slow axis). The analyzer 92 (and/or the filter 40) prevents blurring of the data signal with the delayed data signal that was coupled onto the fast axis due to the perturbation. Also, the analyzer 92 minimizes the effect of the probe signal on the data signal by decreasing the overall total intensity seen by the detector and thereby decreasing the overall noise floor. It should be understood by those skilled in the art that if these effects are small, both the filter 40 and the analyzer 92 along the data receiving path may be omitted.

Although the invention has been shown using two different central wavelengths $\lambda 1, \lambda 2$, it should be understood that the same wavelength may be used for both the data and probe signals. In that case, the filters 40,46 are not needed and only the analyzer 92 isolates the data signal from the unperturbed component of the probe signal along the fast axis.

If two different wavelengths and the associated filters 40,46 are employed, the interference between the data and probe signals is minimized. However, it should be understood that, in general, the interference between the data and probe signals does not cause significant signal detection problems. Therefore, if a single central wavelength is used, the received data and probe signals will not be severely corrupted due to this interference.

More specifically, in the data detector 44 path, the performance degradation resulting from omission of the filter 40 is small because the portion of the continuous wave (cw) broadband probe signal that is coupled onto the slow axis due to the perturbation appears as a constant intensity level which has the data signal superimposed thereon, thereby merely shifting the DC level of the data light intensity. It should be understood that the detector 44 should not go into saturation at the maximum intensity level.

Similarly, in the interferometer 58 path, the performance degradation resulting from omission of filter 46 is small because the portion of the high frequency data signal that enters the interferometer 58, appears as a constant DC level (proportional to the average intensity of the optical data signal) at output of the optical detector 76 because the data rate is high relative to the bandpass characteristics of the optical detector (i.e., the detection bandwidth), thereby merely shifting the DC level of the probe light intensity. The effect of the DC shift is to modestly decrease the signal-to-noise ratio, thereby making it more difficult to accurately locate the perturbation in the transmission line 28.

Furthermore, if the coherence length of the optical data signal is smaller than the scan distance of mirror 72, the DC level caused by the data signal will exhibit interference peaks similar to, but much broader than, those of the probe signal. Consequently, the algorithm used by the CPU to identify the narrow probe signal peaks must account for the broad underlying data signal peaks. In most applications, the DC level caused by the data signal will be small; thus, it may be acceptable to omit the filter 46 even if the probe wavelength $\lambda 2$ and the data wavelength $\lambda 1$ are different.

To help boost the strength of the optical signals, an optional optical amplifier 94 may be placed in the transmission line 28. The amplifier 94 may be located anywhere along the fiber, before or after the perturbation 32. However, if two different wavelengths are used, the amplifier 94 cannot be a narrow band optical amplifier, because it may not allow one of the two wavelengths to pass. Alternatively, an optical amplifier may be incorporated in either or both of the light sources 10,20, to boost the associated optical signal.

Even though the invention has been described as using the fast polarization axis for the probe signal and the slow polarization axis for the data signal, it should be understood by those skilled in the art that the signals and their associated axes may be reversed if desired.

Also, instead of using linearly polarized light and associated optical components as described herein, the invention will work equally well if circularly polarized light and circularly polarized optical fiber 28 and associated optical components 14,24,18,34,40,92,46,54,58, are used.

Although the invention has been described and illustrated with respect to the exemplary embodiments thereof, it should be understood by those skilled in the art that the foregoing and various other changes, omissions and additions may be made without departing from the spirit and scope of the invention.

I claim:

1. A simultaneous data transmission and perturbation detection system, comprising:
    narrow-band data light means, for providing an optical data signal having a narrow wavelength spread and having a central data wavelength;
    first polarizing means, responsive to said optical data signal from said narrow-band light means, for polarizing said optical data signal along a first polarization axis of a polarization preserving birefringent optical fiber, and for providing a polarized optical data signal;
    broadband probe light means, for providing an optical probe signal having a broad wavelength spread and having a central probe wavelength;
    second polarizing means, responsive to said optical probe signal from said broadband light means, for polarizing said optical probe signal along a second polarization axis of said optical fiber orthogonal to said first polarization, and for providing a polarized optical probe signal;
    beam combining means, responsive to said polarized optical data signal and said polarized optical probe signal, disposed at a transmitting end of said optical fiber, for combining said polarized optical data signal and said polarized optical probe signal, for providing a combined optical signal indicative of both said data and said probe signals, and for launching said combined optical signal into said transmitting end of said optical fiber;
    beam splitting means, disposed at a receiving end of said optical fiber, opposite to said transmitting end, for splitting said combined optical signal into a first receiving optical signal having components of said probe signal and said data signal polarized along said first polarization and said second polarization and a second receiving optical signal having components of said probe signal and said data signal polarized along said first polarization and said second polarization;
    data receiving means, responsive to said first receiving optical signal, for substantially extracting said optical data signal from said first receiving signal, and for receiving said optical data signal; and
    probe receiving means, responsive to said second receiving optical signal, for substantially extracting said optical probe signal from said second receiving signal, for determining the location of a perturbation in said optical fiber, said perturbation causing a portion of said probe signal on said second polarization to be coupled onto said first polarization, and for providing a signal indicative of the location of said perturbation.

2. The optical system of claim 1 wherein said probe receiving means comprises:
    analyzer means, for converting said first polarization and said second polarization of said second receiving signal to a common polarization, and for providing a common polarization optical signal; and
    an adjusting interferometer, for determining said location of said perturbation.

3. The optical system of claim 2 wherein said adjusting interferometer comprises:
    a first fixed mirror;
    a second adjustable mirror;
    a beamsplitter, responsive to said common polarization optical signal from said analyzer means, for splitting said common polarization signal into a first and a second signal, said first signal travelling a first fixed distance from said beamsplitter to said first fixed mirror and said second signal travelling a second variable distance from said beamsplitter to said second adjustable mirror, for combining said first and second signal after having travelled said first and said second distances, and for providing an optical interfered signal indicative of the interference of said first and second signals;
    an optical detector, responsive to said interfered signal, for providing an electrical interfered signal indicative of the intensity of said optical interfered signal; and
    signal processing means, responsive to said electrical interfered signal, for measuring said variable distance, and for adjusting said variable distance from said beamsplitter to said second mirror until said electrical interfered signal is a maximum.

4. The optical system of claim 1 wherein said probe receiving means further comprises:
    a phase modulator, disposed in the path of said second signal, for modulating the phase difference between said first and said second signal; and
    a phase demodulator, responsive to said electrical interfered signal from said optical detector, for providing a noise free interference signal.

5. The optical system of claim 1 wherein said data receiving means comprises:
    data filter means, responsive to said first receiving optical signal, for passing said narrow wavelength spread associated with said data signal, and for not passing said broad wavelength spread associated with said probe signal.

6. The optical system of claim 1 wherein said data receiving means further comprises data analyzer means, responsive to said data filter means, for providing an optical signal indicative of optical signals polarized along said first polarization axis.

7. The optical system of claim 1 wherein said probe receiving means comprises:
    probe filter means, responsive to said second receiving optical signal, for passing said broad wavelength spread associated with said data signal, and for not passing said narrow wavelength spread associated with said probe signal.

8. The optical system of claim 1 further comprising at least one optical amplifier, disposed on said optical fiber for boosting said probe and said data optical signals.

9. The optical system of claim 1 wherein said central data wavelength and said central probe wavelength are the same wavelength.

10. The optical system of claim 1 wherein said probe signal is a continuous wave optical signal.

11. The optical system of claim 1 wherein said optical data signal is a high speed communication signal.

* * * * *